United States Patent Office
3,036,714
Patented May 29, 1962

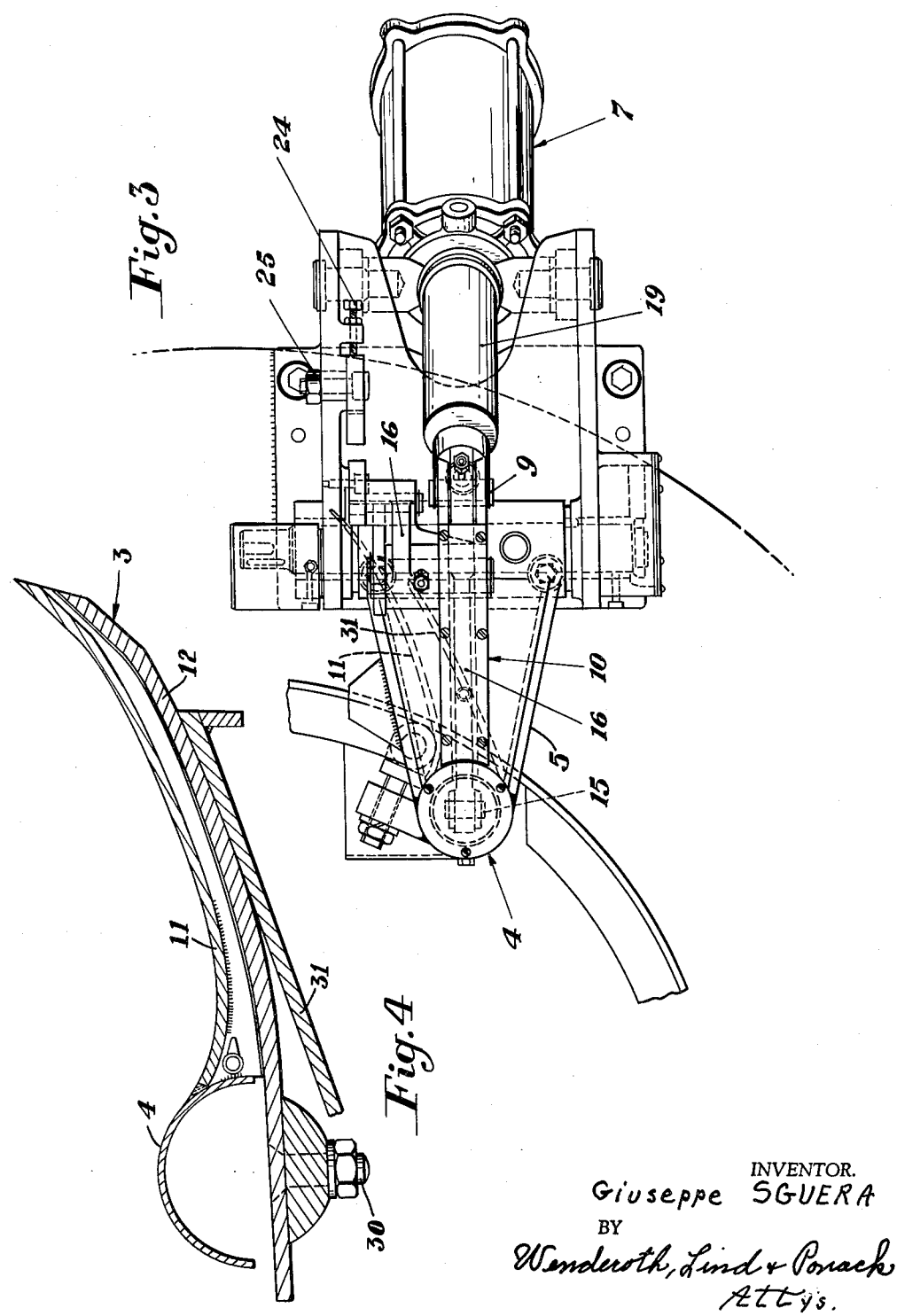

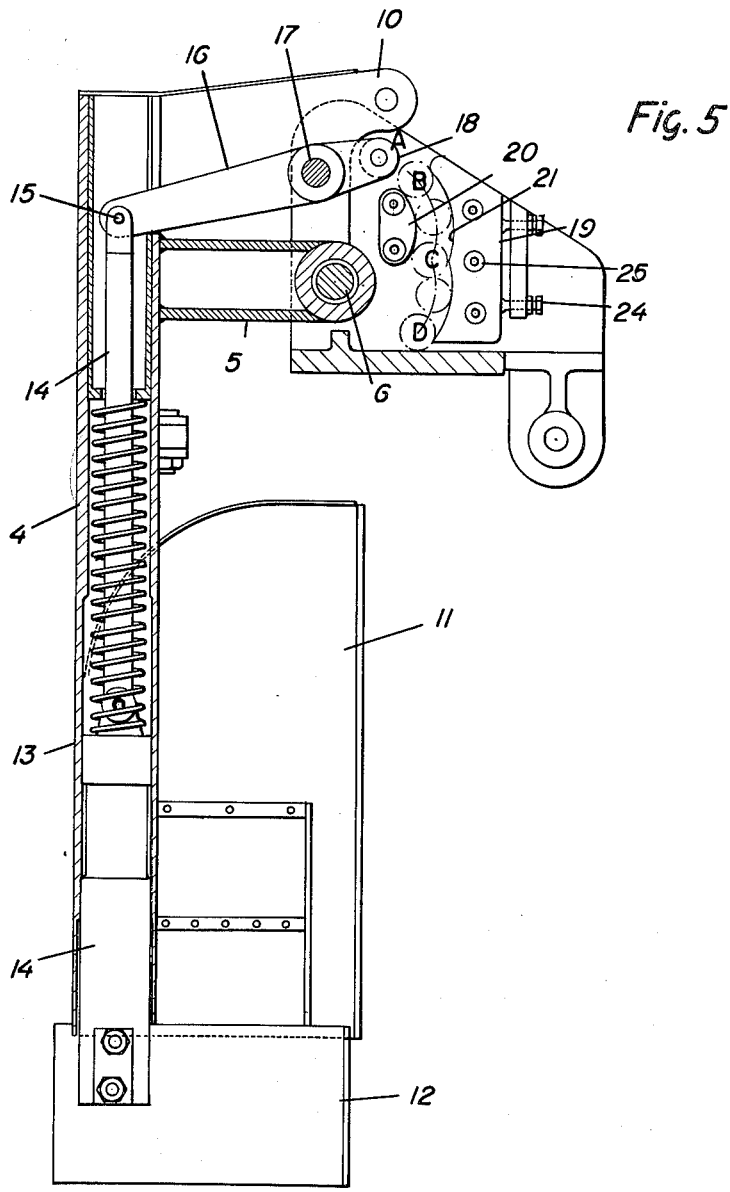

3,036,714
BLADE SCRAPING DEVICE FOR UNLOADING THE CENTRIFUGAL HYDROEXTRACTORS

Giuseppe Sguera, Terni, Italy, assignor to Officine Meccaniche e Fonderie A. Bosco S.p.A., Terni, Italy, a company of Italy
Filed Sept. 24, 1959, Ser. No. 842,105
Claims priority, application Italy July 4, 1959
4 Claims. (Cl. 210—375)

The present invention relates to an improvement in the blade mechanical devices, for unloading the centrifugal hydroextractors, particularly for the sugar making industry.

For said unloading operation a scraping blade is customarily used which is introduced, at the suitable working stage, into the rotary basket to unload the treated material from the basket.

Said blade must be introduced into the basket at the completion of the centrifuging stage and said movement is usually obtained by a turning movement of the blade about a pivot axis which is substantially intersected by one of the generatrices of the basket, which ordinarily has a cylindrical or approximately cylindrical shape. It will be easily understood that such an arrangement involves constructive difficulties since the basket and particularly its mouth must be so sized to allow the introduction, by a turning movement, of the scraping blade, the pivot point of which is outside the basket. Therefore, in most sizes of the used baskets it is impossible to introduce the blade into the basket by a simple turning movement of said blade about an external pivot. Also, it is not feasible to modify the size of either the basket or its mouth, since this would modify in an inadmissible way the basket capacity.

It would also be possible to combine the turning movement of the blade for its introduction into or extraction from the basket respectively, with a parallel transfer movement along a vertical direction of movement, or to provide a turning movement about two pivots, but such an improvement, even if possible, is mechanically and structurally intricated. Further it will be necessary, in this case to take several protective measures to ensure that the various movements to which the blade is to be submitted be carried out in the desired sequence and at the proper times.

The present invention aims to provide an improvement which is capable of simplifying the mechanical solution of the problem associated with the introduction of the scraping blade into the basket, and this with no excessive structural and mechanical complication and allowing thus for:

(a) Applying the swingable blade discharging device to all of the types of standard size baskets as presently used by the sugar making industry, and other industries;

(b) Applying the swinging discharging device to all types of baskets even if they should have sizes and heights greater than those of the present baskets, and it is also possible to embody, if the case may be, the discharging device with a multiple telescopic unit;

(c) Avoiding the dead times necessary with other mechanical systems for introducing the blade into the basket since according to this invention, as will be explained later, the expansion movement of the blade occurs during the turning movement of the blade.

According to this invention, the blade instead of including a single rigid piece, having thus constant dimensions at any moment of its operative cycle, comprises a movable element which is retracted so that the blade has its minimum size, when the blade is out of the basket; said element moving automatically to its extended position so that the blade reaches its maximum size when said blade has been introduced by a single turning movement into the basket, and in other words obtaining the parallel protruding movement by the same blade which, due to its own embodiment extends during the last period of its introduction into the basket, i.e. after the basket mouth has been passed by the blade in its minimum length conditions.

By this improvement the co-ordination problem of the length of the blade with respect to the concerned sizes of the basket is automatically overcome, and there is also automatically solved the safe operation and timing problems concerned with the introduction of a constant length blade into a rotary basket either by a combined parallel transfer and turning movement, or by turning movements, about two centers.

According to this invention the blade is embodied in two parts capable of relative movement in a single plane by a parallel movement, said two parts being mounted on a substantially telescopic shaft, the outer part of which supports the stationary part of the blade while the inner part of said shaft supports the movable part which is therefore extended or contracted upon the movement of said inner portion of the telescopic shaft.

Obviously the particular means whereby, in a particular stage of the turning movement of the blade supporting shaft and therefore of the blade, the relative movement of the two parts forming the telescopic shaft, which respectively support the parts of the blade, is obtained for extending the blade to its operative position or for shortening said blade, to its rest position, is not relevant to the effects of this invention. It will be possible thereby to provide only mechanical means directly combined with the control of the turning movement of the blade, or pneumatic or hydraulic means, remote, if the case may be, from the turning control of the blade and simply timed therewith. Thus it would be possible to provide electrical controls for the above indicated purpose.

In the following specification, with reference to the attached drawings, a presently preferred embodiment of this invention will be disclosed, however without limiting the invention, the principle of which, as aforesaid, is that of forming the blade as a retractable unit suitable to be introduced into the basket in its minimum length conditions said blade being caused to extend to its maximum length when already into the basket.

In the drawings:

FIG. 3 shows a plane top view of the unit shown in FIGS. 1 and 2.

FIG. 4 is a cross-sectional view taken upon section line IV—IV of FIG. 1.

FIG. 5 is a cross-sectional view of the extractor separated from the centrifuge with certain parts shown in elevation.

With reference to the drawings, only the members having a particular relationship with the present invention, even if known from the prior art have been shown in order to show how the cooperation of the same members occurs with those which more specifically are concerned with the embodiment of this invention which will be described.

Figure 1:
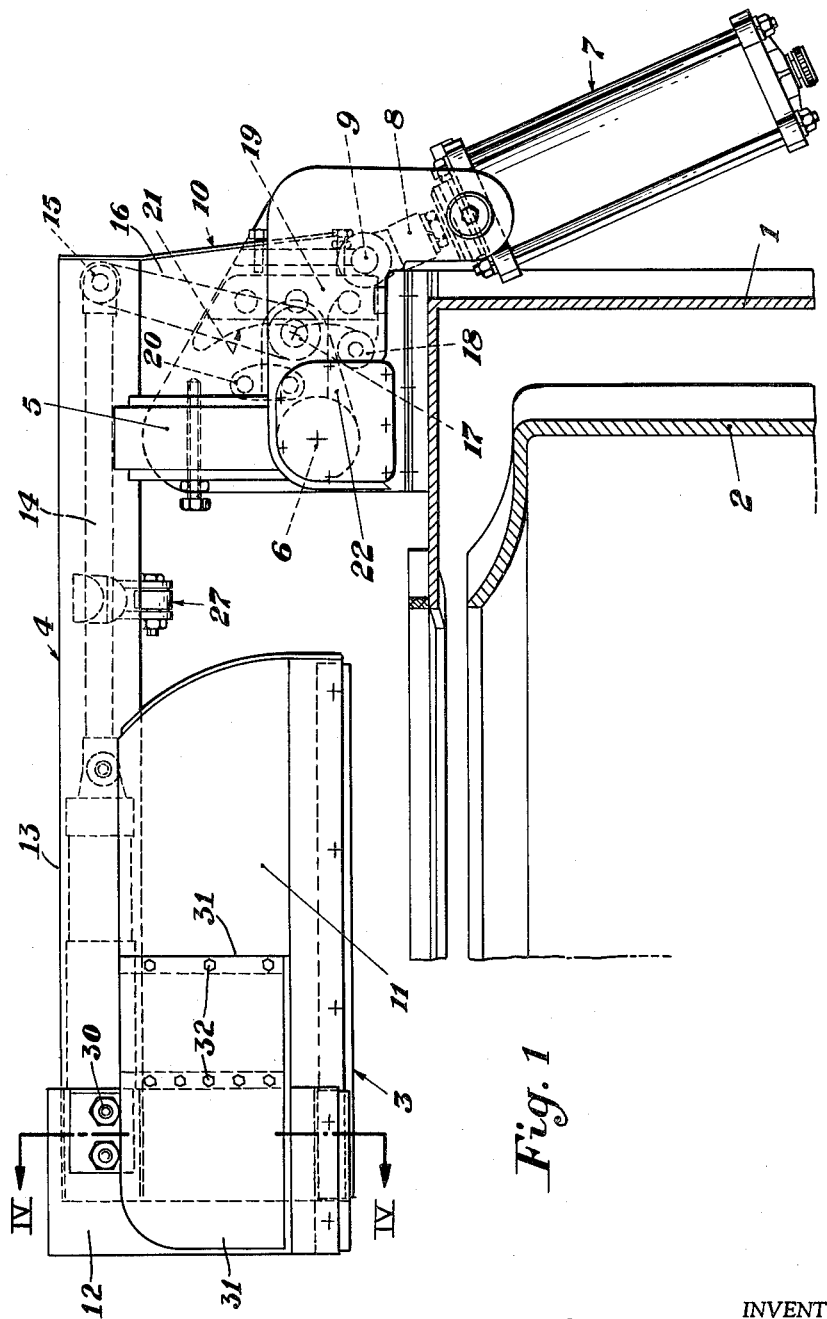
FIG. 1 shows a fragmentary vertical axial sectional view of the upper end of the basket, of the outer housing and of the mechanism for moving the blade from its inoperative position to the operative one, the unit being shown in the blade inoperative position.

1 is the outer housing of a centrifuge, and 2 is its inner basket which is rotated by means not shown in figure. For unloading the centrifuged material, from the basket use is made of the blade generally denoted at 3, which is supported by the shaft 4, the embodiment of the shaft and of the blade being fully described later. The shaft 4 is connected to the arm 5 hinged on the pivot 6 supported by the frame of the machine. The turning movement of the shaft 4 about the pivot 6 is actuated by a hydraulic or pneumatic cylinder 7, the piston 8 of which engages, by its head 9, the structure 10 fixed to the shaft 4 so that in its rest position (FIG. 1) when the piston 8 is entirely withdrawn within the cylinder 7, the shaft 4 is substantially horizontal with the blade 3 entirely out from the basket 2. In the unloading position of the unit i.e. in the operative position of the blade 3, the latter is located inside the basket in such position that the free edge of the blade is very close to the inner wall of the basket, the shaft 5 being substantially vertical and introduced into the basket, parallel or substantially parallel to the rotation axis of the basket.

Such an arrangement is substantially conventional and therefore it has been described only generally.

The assembly, generally denoted by the reference number 3, comprises a blade 11 fixed to the shaft 4, and a movable part 12 mounted on the lower end of the rod 14 by means of bolts 30.

The movable blade 12 is located between the nonslidable part 11 and a backing plate 31 connected to the blade 11 by means of a plurality of bolts 32.

To this purpose the shaft, generally denoted at 4, has a telescopic construction including an outer portion 13 which is rigidly connected to the turning control arm 5 and an inner portion or rod 14 which is telescopically glidable within the tubular outer portion 13. To said tubular portion 13 is connected the nonglidable portion 11 of the blade, while to the inner portion 14 is fastened the movable part 12 of the blade. Obviously the axial movement of the shaft part 14 with respect to the outer tube 13 is capable of moving the blade unit from its extended position to the retracted one, and vice-versa.

Figure 2:
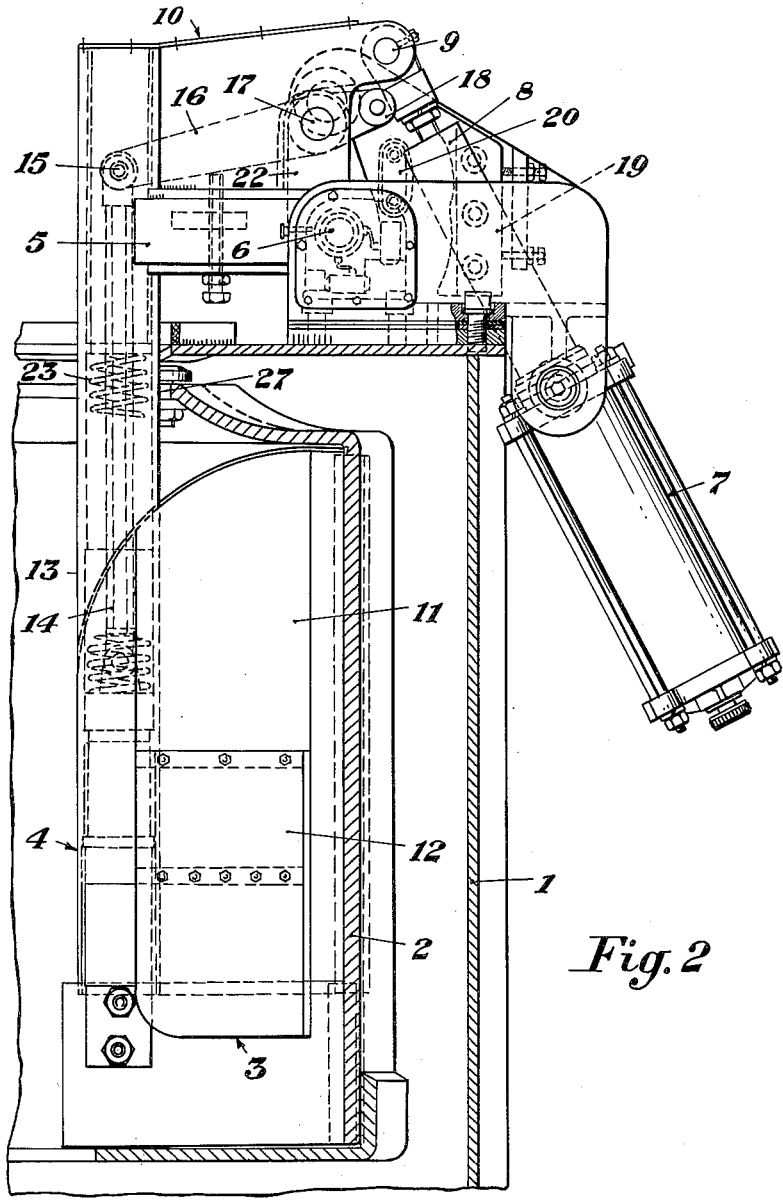
FIG. 2 is a fragmentary vertical sectional view of the basket, and of the outer housing, wherein the movement control unit for the blade has been shown together with the blade in the operative position, the blade being inside the basket.

In order to obtain said movement, the upper end, as viewed in FIG. 2, of the inner rod 14 is pivotally connected at 15 to a rocker 16 pivoted at 17 on an arm 22 fastened to the same pivot whereon is pivoted the arm 5, to rotate with said arm 5. The opposite end of the rocker 16 is provided with a cam follower 18 which can be engaged by a cam unit including two elements 19 and 20 forming a constrained path for said follower.

More specifically, the part 19 of the cam has a two-lobe contour 21 while the part 20 has a simple curve contour. In the rest position of the unit, i.e. when the shaft 4 is substantially horizontal (FIG. 1) the follower 18 is at the lower end of the path to which it is constained with respect to the cam portion 19. When the cylinder 7 is actuated and the piston projects from the cylinder, said piston causes the arm 5 to counterclockwise rotate, as viewed in FIG. 1, about its pivot 6, carrying with said arm 5, the arm 22 to the end of which the the rocker 16 is pivoted at 17. During this movement, the follower 18 moves along the contour 21 of the cam 19, with no possibility of moving away therefrom due to the presence of the cam part 20, and owing to the difference of the curvature radii of the paths followed by the pivot point 17 of the rocker 16 and by the follower 18, which is engaged by the cam 19—20, said rocker carries out a further counterclockwise movement (as viewed in FIGS. 1 and 2) constraining the pivot point 15 to move leftwards, as viewed in FIG. 1, or downwards, as viewed in FIG. 2, causing thus the axial movement of the rod 14 inside the tube 13 which is a component of the shaft 4 and finally the gliding movement of the blade portion 12 with respect to the blade portion 11, causing the blade to reach its fully extended operative position corresponding to the operative discharge size of the basket.

Of course, the blade passes through the mouth of the basket in its retracted condition, allowing the size of said mouth to be kept within the most suitable limits, while said blade extends subsequently inside the basket, so that it will be possible to embody for the latter the most suitable depth. Obviously the movements reverse to the above described ones will be carried out when the blade is extracted from the basket.

Only by way of more detailed structural description it will be possible to mention that between the tubular portion 13 and the rod portion 14 of the shaft 4 a spring is interposed, having a dampening function against the possible shocks to which the blade might be submitted during the course of the basket unloading operation.

The unit is completed by the set screws 24 and 25 (FIG. 3) allowing the position of the cam unit to be adjusted to exactly adjust the movement of the arm 16 and therefore to adjust both in time and space the extension and contraction movements of the blade 3.

Also, the shaft 4 is provided according to a conventional technique with a roller 27 destined to rest on the edge of the basket 2 when the shaft is received into the basket.

The extractor is shown in FIGURE 5 as separated from the centrifuge, without the control cylinder 7 and without counter-blade. The movable blade is indicated at 12. The counter-blade serves for providing an interspace with the blade 11, wherein the movable blade can slide during its vertical retraction movement.

In the drawing are also shown the several positions assumed by the follower 18 during the rotation movement of the extractor about the pivot 6. It is clear that during such movement the follower 18 will be shifted from A to B, following the circular path having as a center the pivot 6.

Since during this movement the follower is wholly disengaged from the cams 19 and 20, the lever 16 will not be shifted and therefore the movable blade will remain in the fully extended position. At the point B the follower will be pushed against the cam 19 and will approach the pivot 6 by following the contour 21 of the cam 19. It is to be noted that, abstracting from the cams, by approaching the follower 18 to the pivot 6 a rotation movement of the lever 16 about the pivot 17 and hence an upward movement of the retractile blade will be caused. Afterwards, the contour 21 of the cam 19 will cause the retraction of the blade, which retraction will be greatest at the point C of the cam 19.

Therefore, since the distance between the follower 18, and pivot 6 remains constant, there will not be any relative movement of the lever 16 and hence the blade will remain in the retracted position till the end of the movement of the extractor. The opposed movement of the extractor and of the lever will take place obviously in the same way, even though inverted. It is to be noted that, as the blade is continuously outwardly pushed by the return spring, the follower also will be pushed continuously against the contour 21 of the cam 19 through the members 14 and 16. Therefore the cam 20 will operate only in the case wherein the spring would not have a force sufficient for causing the extension of the blade. In this case the follower will follow the path DC till it strikes on the cam 20 which will cause the extension of the blade.

It is to be understood that, as previously indicated, the extension and contraction movements of the blade could also be obtained by different methods and having a different nature, without departing thereby from the scope of the present invention and therefore it will be clear that while a specific embodiment of this invention has been illustrated and described in detail to illustrate the application of the invention principles, it will be understood that said invention may be embodied otherwise without departing from such principles.

I claim:

1. A mechanical scraping device for hydro-extractors having a casing and a basket rotating therein about an axis, comprising a blade having a fixed portion and a slidable portion, said slidable portion being parallel and closely adjacent said fixed portion, a telescoping unit supporting said blade, a rocker arm pivotally mounted at an intermediate point of its length on said casing and coupled to said telescoping unit, said telescoping unit being pivotally mounted on said casing to swing from a position substantially normal to said axis above said casing to a position substantially parallel to said axis within said basket, damping means disposed between said fixed and slidable portions, means for pivoting said blade from said normal to said parallel position and cam control means for extending and retracting said slidable portion with relation to said fixed portion.

2. A mechanical scraping device as claimed in claim 1, wherein said telescoping unit comprises a tubular hollow shaft supporting said fixed portion and a rod slidably mounted within said tubular shaft supporting said slidable portion, said rod at its end remote from said slidable portion being pivotally connected to said rocker arm.

3. A mechanical scraping device as claimed in claim 1, wherein said damping means comprises a return spring pushing said slidable portion of said blade outwardly.

4. A mechanical scraping device as claimed in claim 1, wherein said cam control means comprises an adjustable first cam fixed to said casing and having two contours shaped to extend and retract said slidable portion when said blade is in said normal position and in said parallel position respectively and to secure a synchronous operation with said pivoting means, and a second cam disengaging said return spring in case of clogging thereof.

References Cited in the file of this patent
UNITED STATES PATENTS

| | | |
|---|---|---|
| 985,679 | Johnson | Feb. 28, 1911 |
| 1,701,731 | Schaum | Feb. 21, 1929 |
| 1,909,188 | Roberts | May 16, 1933 |
| 2,037,655 | Roberts | Apr. 14, 1936 |
| 2,870,911 | Moretti | Jan. 27, 1959 |